(12) United States Patent
Mani et al.

(10) Patent No.: US 10,055,153 B2
(45) Date of Patent: *Aug. 21, 2018

(54) IMPLEMENTING HIERARCHICAL DISTRIBUTED-LINKED LISTS FOR NETWORK DEVICES

(71) Applicant: Innovium, Inc., San Jose, CA (US)

(72) Inventors: Avinash Gyanendra Mani, San Jose, CA (US); Mohammad K. Issa, Los Altos, CA (US); Neil Barrett, Palo Alto, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,571

(22) Filed: Sep. 1, 2017

(65) Prior Publication Data

US 2017/0364291 A1    Dec. 21, 2017

Related U.S. Application Data

(63) Continuation of application No. 15/192,595, filed on Jun. 24, 2016, now Pat. No. 9,753,660, which is a
(Continued)

(51) Int. Cl.
*G06F 12/00* (2006.01)
*G06F 3/06* (2006.01)
(Continued)

(52) U.S. Cl.
CPC ............ *G06F 3/0619* (2013.01); *G06F 3/061* (2013.01); *G06F 3/064* (2013.01); *G06F 3/065* (2013.01);
(Continued)

(58) Field of Classification Search
CPC .... G06F 3/0619; G06F 3/0644; G06F 3/0673; G06F 3/064; G06F 3/065; G06F 3/067; H04L 67/1097; H04L 67/1095
(Continued)

(56) References Cited

U.S. PATENT DOCUMENTS 5,093,910 A    3/1992  Tulpule et al.
6,032,207 A    2/2000  Wilson
(Continued)

FOREIGN PATENT DOCUMENTS

TW    201028852    8/2010
TW    201342243    10/2013
(Continued)

OTHER PUBLICATIONS

United States Office Action in U.S. Appl. No. 14/800,649, dated Sep. 13, 2016.
(Continued)

*Primary Examiner* — Matthew Bradley
(74) *Attorney, Agent, or Firm* — Fish & Richardson P.C.

(57) ABSTRACT

A memory system for a network device is described. The memory system includes a main memory configured to store one or more data elements. Further, the memory system includes a parent distributed-linked list configured to store linked-list metadata. And, the memory system includes a child distributed-linked list configured to maintain list metadata to interconnect the one or more data elements stored in the main memory to generate at least a first snapshot, said linked-list metadata references the snapshot.

20 Claims, 9 Drawing Sheets

Related U.S. Application Data continuation of application No. 14/800,654, filed on Jul. 15, 2015, now abandoned.

(51) Int. Cl.
  *H04L 29/08* (2006.01)
  *G06F 12/02* (2006.01)

(52) U.S. Cl.
  CPC ............ *G06F 3/067* (2013.01); *G06F 3/0644* (2013.01); *G06F 3/0673* (2013.01); *G06F 12/02* (2013.01); *H04L 67/1095* (2013.01); *H04L 67/1097* (2013.01)

(58) Field of Classification Search
  USPC .......................................................... 711/162
  See application file for complete search history.

(56) References Cited

U.S. PATENT DOCUMENTS

| | | |
|---|---|---|
| 6,117,185 A | 9/2000 | Schmidt |
| 7,321,951 B2 | 1/2008 | Wong et al. |
| 7,349,382 B2 | 3/2008 | Marimuthu |
| 7,627,870 B1 | 12/2009 | Michaeli et al. |
| 7,793,146 B1 | 9/2010 | Gibson et al. |
| 8,126,927 B1 | 2/2012 | Binshtock et al. |
| 8,515,911 B1 | 8/2013 | Zhou et al. |
| 8,600,953 B1 | 12/2013 | Gerber |
| 8,984,183 B2 | 3/2015 | Purcell et al. |
| 2001/0026497 A1 | 10/2001 | Manning |
| 2003/0061597 A1 | 3/2003 | Curtis et al. |
| 2003/0120835 A1 | 6/2003 | Kale et al. |
| 2003/0196024 A1 | 10/2003 | Frank |
| 2003/0235189 A1 | 12/2003 | Mathews et al. |
| 2004/0221120 A1 | 11/2004 | Abrashkevish et al. |
| 2004/0260674 A1 | 12/2004 | Primm |
| 2004/0268067 A1 | 12/2004 | Yamagami |
| 2006/0206536 A1 | 9/2006 | Sawdon et al. |
| 2006/0268867 A1 | 11/2006 | Hashimoto |
| 2006/0294118 A1 | 12/2006 | Lubbers et al. |
| 2007/0043561 A1 | 2/2007 | Helbing |
| 2007/0136385 A1 | 6/2007 | Abrashkevish et al. |
| 2007/0198979 A1 | 8/2007 | Dice et al. |
| 2008/0046475 A1 | 2/2008 | Anderson et al. |
| 2009/0006804 A1 | 1/2009 | Lubbers et al. |
| 2009/0132563 A1 | 5/2009 | Herlihy et al. |
| 2009/0164437 A1 | 6/2009 | Torbjomsen |
| 2010/0030809 A1 | 2/2010 | Nath |
| 2010/0064073 A1 | 3/2010 | Schroth |
| 2010/0125554 A1 | 5/2010 | Jennings |
| 2010/0306467 A1 | 12/2010 | Pruthi |
| 2010/0318749 A1 | 12/2010 | Matthews |
| 2010/0325181 A1 | 12/2010 | Skillcom |
| 2011/0087854 A1 | 4/2011 | Rushworth et al. |
| 2011/0164618 A1 | 7/2011 | Sindhu et al. |
| 2011/0167192 A1 | 7/2011 | Iyer et al. |
| 2011/0185106 A1 | 7/2011 | Yano et al. |
| 2011/0196985 A1 | 8/2011 | Li et al. |
| 2012/0011166 A1 | 1/2012 | Soulard et al. |
| 2012/0197868 A1 | 8/2012 | Fauser et al. |
| 2012/0203739 A1 | 8/2012 | Soundararajan et al. |
| 2013/0019051 A1 | 1/2013 | Somanache et al. |
| 2013/0036274 A1 | 2/2013 | Bouchard et al. |
| 2013/0086332 A1 | 4/2013 | Mital |
| 2013/0091499 A1 | 4/2013 | Soundararajan et al. |
| 2013/0121341 A1 | 5/2013 | Agrawal |
| 2013/0151467 A1 | 6/2013 | Krishnan et al. |
| 2013/0198854 A1 | 8/2013 | Erway et al. |
| 2013/0215886 A1 | 8/2013 | Sindhu et al. |
| 2013/0275712 A1 | 10/2013 | Rushworth et al. |
| 2013/0339569 A1 | 12/2013 | Yochai et al. |
| 2014/0012963 A1 | 1/2014 | Swenson et al. |
| 2014/0059311 A1 | 2/2014 | Oberhofer et al. |
| 2014/0250088 A1 | 9/2014 | Klose |
| 2014/0281119 A1 | 9/2014 | Hyun |
| 2014/0344536 A1 | 11/2014 | Benisty et al. |
| 2014/0351535 A1 | 11/2014 | Santry |
| 2015/0237180 A1 | 8/2015 | Swartzentruber et al. |
| 2015/0270015 A1 | 9/2015 | Murphy et al. |
| 2015/0295883 A1 | 10/2015 | Suram et al. |
| 2015/0340033 A1 | 11/2015 | Di Fabbrizio et al. |
| 2015/0355981 A1 | 12/2015 | Booss et al. |
| 2016/0147827 A1 | 5/2016 | Diaconu et al. |
| 2016/0154835 A1 | 6/2016 | Dickie |
| 2016/0179865 A1 | 6/2016 | Bortnikov et al. |
| 2016/0292079 A1 | 10/2016 | Musoll |

FOREIGN PATENT DOCUMENTS

| | | |
|---|---|---|
| TW | 201346769 | 11/2013 |
| TW | 201432685 | 8/2014 |

OTHER PUBLICATIONS

United States Office Action in U.S. Appl. No. 14/800,654, dated Sep. 13, 2016.
United States Office Action in U.S. Appl. No. 14/846,166, dated Sep. 8, 2016.
United States Office Action in U.S. Appl. No. 14/975,634, dated Sep. 9, 2016.
United States Office Action in U.S. Appl. No. 15/192,595, dated Aug. 26, 2016.
United States Office Action in U.S. Appl. No. 15/192,820, dated Sep. 7, 2016.
United States Office Action in U.S. Appl. No. 15/192,882, dated Aug. 5, 2016.
United States Office Action in U.S. Appl. No. 14/975,585, dated Sep. 8, 2016.
United States Office Action in U.S. Appl. No. 15/192,517, dated Aug. 12, 2016.
United States Office Action in U.S. Appl. No. 15/192,820, dated Feb. 1, 2017, 39 pages.
International Search Report and Written Opinion in International Application No. PCT/US2016/042275, dated Sep. 26, 2016.
International Search Report and Written Opinion in International Application No. PCT/US2016/042292, dated Sep. 26, 2016.
International Search Report and Written Opinion in International Application No. PCT/US2016/042303, dated Sep. 26, 2016.
International Search Report and Written Opinion in International Application No. PCT/US2016/042312, dated Oct. 20, 2016.
International Search Report in International Application No. 105122268, dated Apr. 25, 2017, 12 pages (with English translation).
United States Notice of Allowance in U.S. Appl. No. 15/624,896, dated Jul. 14, 2017, 12 pages.
Taiwan Office Action in Taiwan Application No. I92560/198316, dated Aug. 15, 2017, 16 pages (with partial English translation).
Taiwan Search Report in Taiwan Application No. 106124739, dated Sep. 26, 2017, 1 page (English translation).
Taiwan Office Action in Taiwan Application No. I92560/198318, dated Oct. 11, 2017, 15 pages (with partial English translation).
International Preliminary Report on Patentability in International Application No. PCT/US2016/042292, dated Jan. 16, 2018, 11 pages.

IMPLEMENTING HIERARCHICAL DISTRIBUTED-LINKED LISTS FOR NETWORK DEVICES

CROSS-REFERENCE TO RELATED APPLICATIONS

This is a continuation of U.S. patent application Ser. No. 15/192,595, filed on Jun. 24, 2016, now allowed, which is a continuation of U.S. patent application Ser. No. 14/800,654, filed on Jul. 15, 2015, now abandoned. Both of these prior applications are incorporated by reference in their entirety.

FIELD

Embodiments of the invention relate to network devices. In particular, embodiments of the invention relate to memory systems for network devices.

BACKGROUND

Network devices are used to transfer data between nodes in a network. As the networks grow and the data rates of communication channels increase, the need to increase the amount of data a network device can handle within a period of time arises. To meet the demands of these networks, devices need memory systems designed to read data into and write data out of memory to accommodate the demands of the network and to minimize any collisions between read requests and write requests. Current systems meet the high capacity and high data rate demands of networks by increasing the number of access ports of a memory and/or increasing the clock speed of the memory, which requires state of the art semiconductor technologies. However, increasing the number of access ports on the memory and using state of the art semiconductor technologies to increase the operating frequency of memory significantly adds to the cost of the memory and to the power budget required to operate these memories.

SUMMARY

A memory system for a network device is described. The memory system includes a main memory configured to store one or more data elements. Further, the memory system includes a link memory that is configured to maintain one or more pointers to interconnect the one or more data elements stored in the main memory. The memory system also includes a free-entry manager that is configured to generate an available bank set including one or more locations in the link memory. In addition, the memory system includes a context manager that is configured to maintain metadata for multiple lists, where each list contains one or more data elements.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Implementations for a distributed-linked list for network devices are described. In particular, a memory system is described that is configured to manage data by implementing a distributed-linked list. The memory system includes a main memory for storing data received by a network device. Further, the memory system includes a distributed-linked list. The distributed-linked list includes a link memory, a free entry manager, and a context manager. The distributed-linked list is configured to track the locations of data stored in a main memory and bind the locations to a list to maintain a sequential relationship between the data. Further, the distributed-linked list uses banked memory structures to maintain a sequential relationship between the data stored in a main memory without the need for a direct relationship between the main memory and the distributed-linked list. Such an architecture provides the ability to use single port memory and lower operating frequencies which lowers the cost and complexity of the memory system while still meeting the performance demands of a high capacity network.

Figure 1:
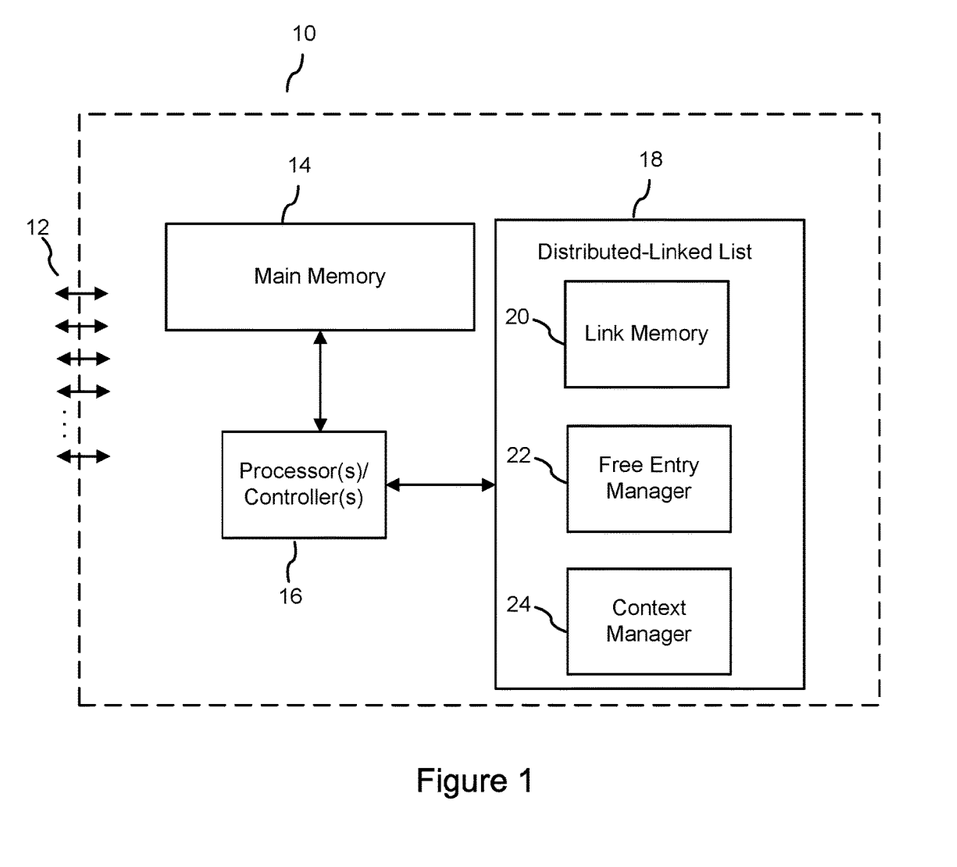
FIG. 1 illustrates a block diagram of a network device including a memory system implementing distributed-linked lists according to an embodiment.

FIG. 1 illustrates a block diagram of a network device including a memory system implementing distributed-linked lists according to an embodiment. Specifically, FIG. 1 illustrates a network device 10 including a plurality of input/output ports 12. Data packets are received and transmitted through the ports 12 using techniques including those known in the art. The ports 12 are coupled with a main memory 14. A main memory may include memory technologies including, but not limited to, dynamic random-access memory ("DRAM"), static random-access memory ("SRAM"), flash memory, and other technologies used to store data including those known in the art.

The main memory 14 is coupled with one or more processors 16. A processor 16 may include, without limitation, a central processing unit ("CPU"), a controller, an application-specific integrated circuit ("ASIC"), field-programmable gate arrays ("FPGA"), or other types of control units. The one or more processors 16 are configured to manage access to the main memory 14 using techniques including those known in the art. For example, the one or more processors 16 are configured to determine a location to store data received on one or more ports 12. The one or more processors 16 are also configured to read data stored in the main memory 14 when the data is to be transmitted on one or more ports 12. Further, the one or more processors 16 are configured to overwrite, update, and invalidate memory locations using techniques including those known in the art.

Further, the embodiment illustrated in FIG. 1 includes a distributed-linked list 18. The distributed-linked list 18 is coupled with one or more processors 16. Further, the distributed-linked list 18 includes a link memory 20, a free entry manager 22, and a context manager 24. The link memory 20 is configured to maintain metadata to interconnect data elements stored in the main memory 14. For an embodiment, maintaining metadata includes generating, storing, and updating metadata using techniques including those described herein. In addition, the link memory 20 is configured to store metadata including one or more pointers to reference data elements stored in the main memory 14. The link memory 20 may include one or more of the memory technologies as described herein. The link memory 20 includes a plurality of locations for storing information. Each of the plurality of locations has an address used to access data stored in the location. For an embodiment, link memory 20 includes a plurality of memory banks with each of the memory banks including a plurality of locations and each location having an address used to access data.

A distributed-linked list 18, according to the embodiment illustrated in FIG. 1, also includes a free entry manager 22. The free entry manager 22 is configured to generate an available bank set of locations in the link memory 20. The available bank set is a group of one or more addresses in the link memory 20 that are not in use or allocated. For an embodiment, the one or more addresses reside in different memory banks of the link memory. For example, the free entry manager 22 is configured to maintain a list of one or more addresses of the locations in memory that are not used or allocated for storing metadata for a data element currently stored in the main memory 14 as an available bank set. For an embodiment, a free entry manager 22 uses one or more memory technologies including those known in the art for storing an available bank set. For an embodiment, the one or more processors 16 are configured to remove a link memory address from the free entry manager 22 when a link memory address is used or allocated to interconnect data elements stored in a main memory 14. Further, the one or more processors 16 are configured to add a link memory address to the free entry manager 22 after the link memory address is no longer in use. For example, once a data element is read from main memory 14, the one or more processors 16 are configured to deallocate or invalidate a location of link memory 20 associated with the data element, which includes writing the address of the location in the free entry manager 22.

According to the embodiment illustrated in FIG. 1, the distributed linked list includes a context manager 24. The context manager 24 is configured to maintain metadata including pointers that interconnect one or more data elements stored in the main memory 14. For an embodiment, the context manager 24 maintains metadata including a head address, or the address in the link memory 20 for the first entry in a list, and a tail address, the address in the link memory 20 for the last entry in the list stored in the link memory 20. For an embodiment, the memory system implementing a distributed-linked list as described herein provides the benefit of delinking the main memory from the link memory. The delinking provides the use of more efficient memory technologies and architecture including, but not limited to, using single port memory and using memory with lower clock rates. This provides the use of lower cost memory technologies and lower power consumption while meeting the needs of a high-speed, high-capacity network device.

Figure 2:
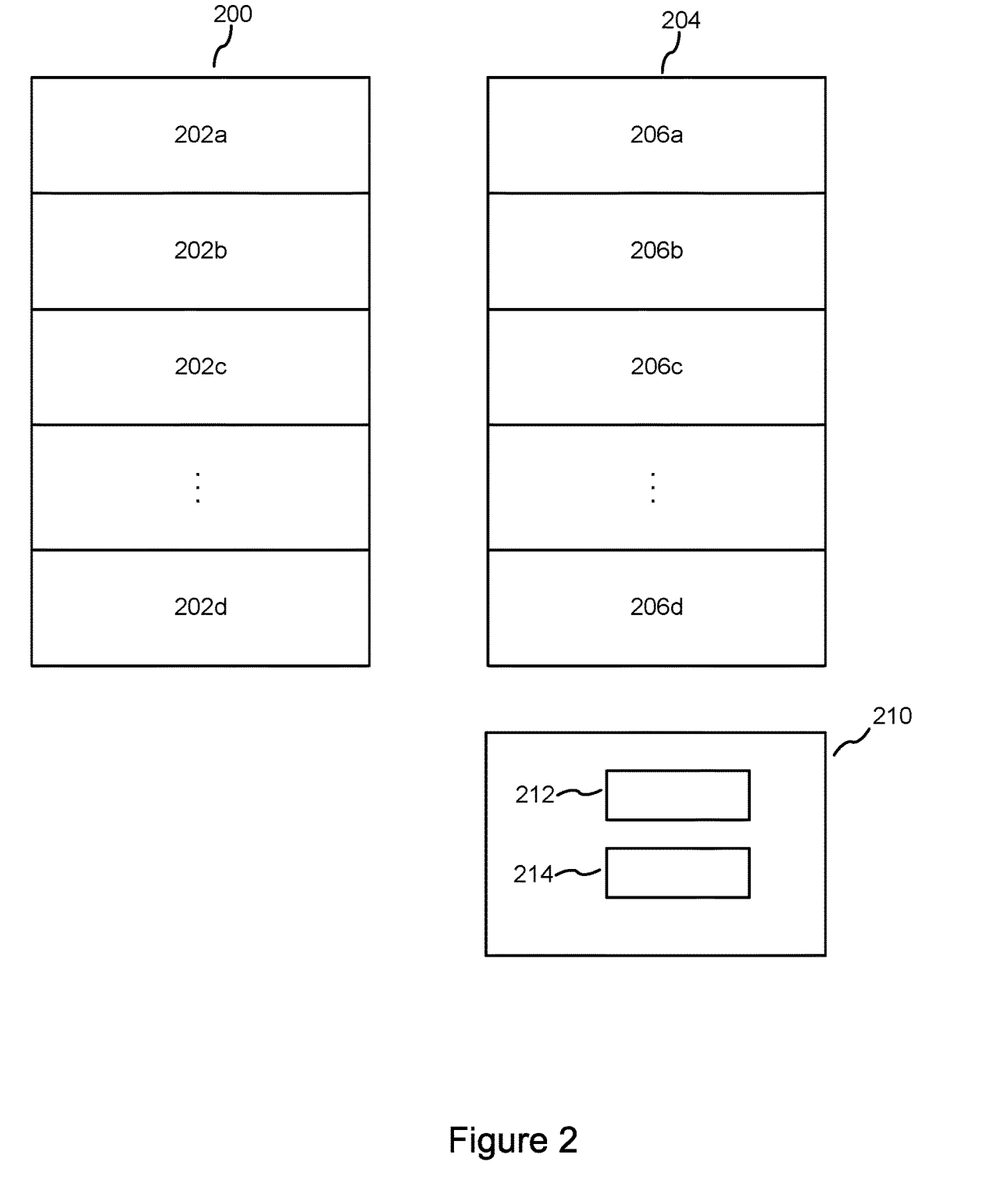
FIG. 2 illustrates a block diagram of a portion of a memory system according to an embodiment.

FIG. 2 illustrates a block diagram of a portion of a memory system according to an embodiment. The portion of a memory system includes a main memory 200, a link memory 204, and a context manager 210. The main memory 200 includes one or more locations 202a-d for storing data elements. A data element includes, but is not limited to, a data packet or a cell of a data packet. As is known in the art, a data packet may be split up into a plurality of cells. These locations 202a-d are accessed using addresses associated with each of the one or more locations 202a-d using techniques including those known in the art. The link memory 204 also includes locations 206a-d for storing metadata to generate one or more lists. For example, the processor 16 is configured to write metadata into the locations 206a-d that interconnect the locations 202a-d to form entries in the list. The list maintains an order of the sequence that the data elements stored in the main memory 200 should be read from the main memory 200. The order may be based on one or more of first-in, first out (FIFO), priority, or other criteria including those known in the art for network devices.

For an embodiment, the link memory 204 is configured to store metadata, such as one or more pointers, used to interconnect entries to form one or more lists of the data elements stored in main memory. For an embodiment, metadata, such as a pointer, stored in the link memory 204 specifies the address of a location within the link memory 204 of the next entry in the list. In addition to a pointer, a location 206a-d in the link memory 204 includes, according to an embodiment, other metadata including, but not limited to, a sequence identifier (e.g., a data-element sequence identifier) and an address of a location in the main memory for a data element. A sequence identifier denotes the order or sequence that data elements and snapshots are to be read from memory. For an embodiment, a data-element sequence identifier is based on the order the data elements were received at a network device. Moreover, the link memory 204 is configured to store the address in a location 206a-d of the link memory 204 for the location 202a-d in main memory 200 which a data element was stored.

The embodiment illustrated in FIG. 2 also includes a context manager 210. The context manager 210 is configured to maintain metadata for one or more lists, where each list includes one or more data elements. Specifically, the context manager 210 includes a head entry 212 and a tail entry 214 configured to store metadata for the head or first entry of a list and the tail or the last entry of the list. The metadata for the head and the tail, for an embodiment, is stored in one or more registers. However, one skilled in the art would understand that other memory technologies could be used including those described herein. The metadata stored in the head entry 212 includes the address of the location 202a-d in the main memory 200 where the first entry of a list is stored. The metadata stored in the head entry 212 also includes a pointer to the location 206a-d of the next entry in a list. For example, the pointer is an address to a location 206a-d in the link memory 204 that is the next entry in the list. In addition, the head entry 212 may include a data-element sequence identifier of the data element. The tail entry 214 includes one or more of the type of metadata described above, but for the last entry in a list. In the case, that a list includes only one data element, the head entry 212 and the tail entry 214 would include the same metadata. For an embodiment, one or more processors are used to update, overwrite, and invalidate the metadata in the head entry 212 and the tail entry 214 as data elements are stored in or read from the main memory 200.

Figure 3:
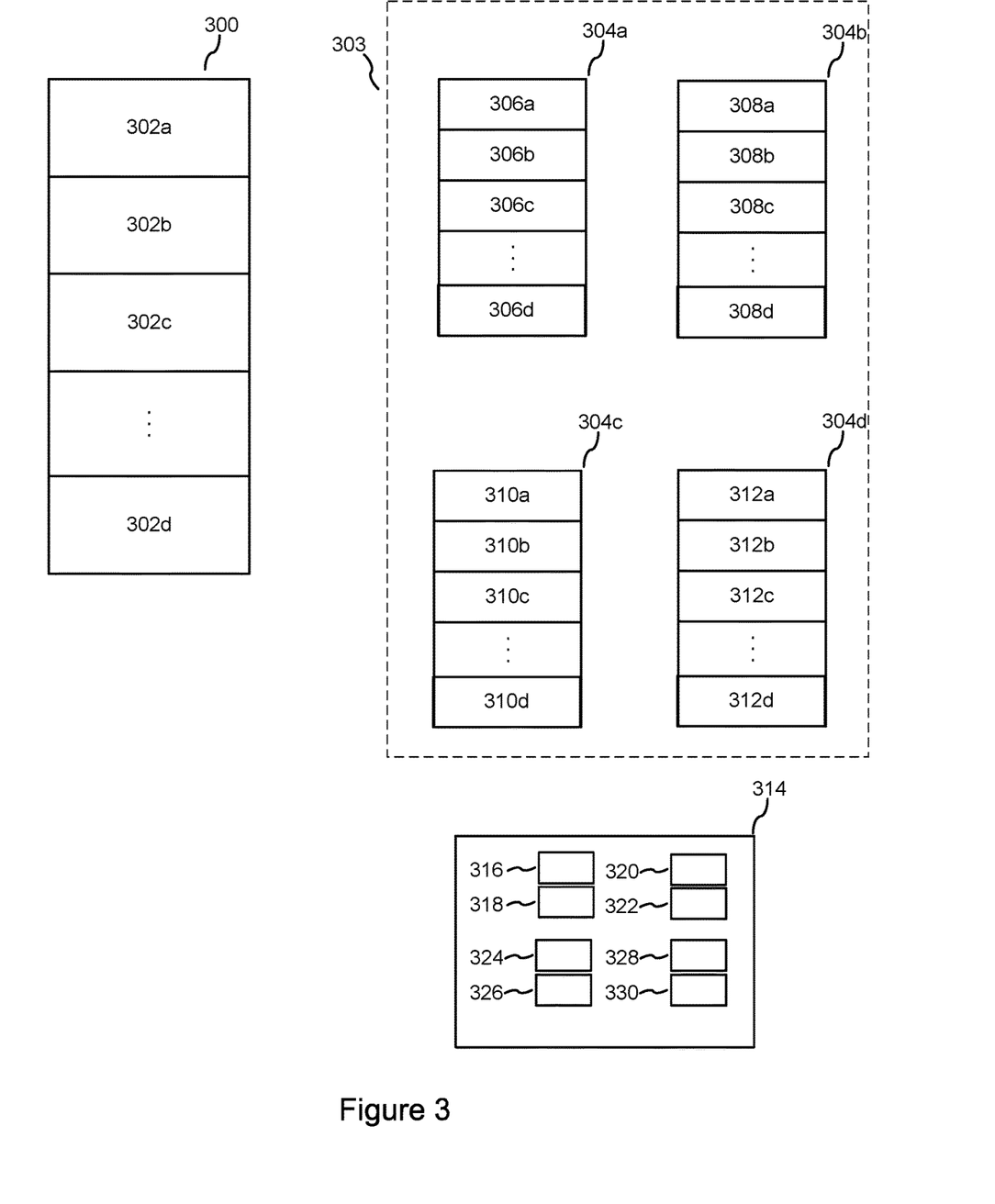
FIG. 3 illustrates a block diagram of a portion of a memory system including multiple banks of link memory according to an embodiment.

FIG. 3 illustrates a block diagram of a portion of a memory system including multiple banks of distributed-linked list memory according to an embodiment. The portion of a memory system includes a main memory 300, a link memory 303, and a context manager 314. The main memory 300 may be implemented using techniques described herein. The link memory is formed from an array of memory elements, such as memory banks 304*a-d*. For an embodiment, each memory bank 304*a-d* is a single port memory that provides a single access per clock cycle. As illustrated in FIG. 3, the embodiment includes a first memory bank 304*a* including locations 306*a-d*, a second memory bank 304*b* including locations 308*a-d*, a third memory bank 304*c* including locations 310*a-d*, and a fourth memory bank 304*d* including locations 312*a-d*.

As described above, the link memory is configured to store metadata including pointers to reference to the address of the location of data elements stored in the main memory. As a pointer to a location of main memory can be used, a direct relationship between the location of the main memory and the location of the link memory is not required. This provides the flexibility to use a separate and different architecture for the main memory and the link memory, such as the link memory having multiple banks of memory for every bank of main memory. The use of multiple banks of link memory provides the ability to use memory having a single access port and/or memory with lower clock speeds. As described above, the link memory is configured to store pointers used to interconnect entries to form a list of data elements stored in main memory using techniques including those described above. Further, the use of multiple banks of link memory provides an architecture that can scale to support higher capacity systems. For example, a memory system using multiple banks of link memory can be designed to handle at least K+1 memory accesses per clock cycle, where K is the number of data elements per clock cycle that can be stored in a main memory and 1 is the number of reads from main memory. Other examples of a memory system are configured to support more than 1 read from main memory per clock cycle using the techniques including those described herein.

As illustrated in FIG. 3, the embodiment also includes a context manager 314. Context manager 314 includes multiple tail and head entries. Specifically, the context manager 314 includes a first head entry 316 and a first tail entry 318 for the first bank of link memory 304*a*, a second head entry 320 and a second tail entry 322 for the second bank of link memory 304*b*, a third head entry 324 and a third tail entry 326 for the third bank of link memory 304*c*, and a fourth head entry 328 and a fourth tail entry 330 for the fourth bank of link memory 304*d*. Each set of tail and head entries maintains metadata for the first and last entry of a list, respectively, for each bank. That is, the first head entry 316 maintains metadata for the first entry stored in the first bank 304*a* and the first tail entry 318 maintains metadata for the last entry stored in the first bank 304*a*. The second head entry 320 maintains metadata for the first entry stored in the second bank 304*b* and the second tail entry 322 maintains metadata for the last entry of a list stored in the second bank 304*b*. The third head entry 324 maintains metadata for the first entry of a list stored in the third bank 304*c* and the third tail entry 326 maintains metadata for the last entry of the list stored in the third bank 304*c*. The fourth head entry 328 maintains metadata for the first entry of a list stored in the fourth bank 304*d* and the fourth tail entry 330 maintains metadata for the last entry of the list stored in the fourth bank 304*d*. Each head and tail entry is configured to store metadata including metadata described herein. Together the lists of each bank 304*a-d* are used to generate a complete list that interconnects the data elements stored in the main memory 300.

For an embodiment, a processor is configured to assign a data-element sequence identifier to each data element received on a port. The data-element sequence identifier is assigned to each data element to indicate the order in which each data element was received. The data-element sequence identifier is stored as metadata in the location of the link memory as described herein. In addition, the data-element sequence identifier is stored in a head entry and tail entry if the corresponding data element stored in the main memory is the head of a list in a bank or a tail of a list in a bank.

For an embodiment including multiple banks of link memory, such as the embodiment illustrated in FIG. 3, the memory system is configured to determine the next element in a list by comparing data-element sequence identifiers assigned to data packets. A memory system configured to determine the next element includes a processor configured to read the head entries 316, 320, 324, and 328 stored for each bank 304*a-d* in the link memory 303. The processor compares the data-element sequence identifiers stored in all of the head entries 316, 320, 324, and 328 to determine which of the data elements is next in a list. For an embodiment, the lowest data-element sequence identifier is a numerical value assigned such that the lowest numerical value can be used to determine the next data element in a list; however, the system is not limited to using the lowest data-element sequence identifier as an indicator. A data-element sequence identifier, according to an embodiment, is assigned to a data element upon arrival to the network device. Once the processor determines the next data element in the list, the processor is configured to retrieve the address of the main memory location 302*a-d* where the data element is stored. For an embodiment, a processor is configured to retrieve the address from the head entry 316, 320, 324, and 328 having the lowest data-element sequence identifier. A processor is further configured to use the retrieved address to read the data element out of main memory.

For an embodiment, a processor is configured to update the metadata of a data element read out of the main memory that is stored in the head entry. The processor is configured to use the address of the location in the link memory 303 that stores the next entry in the list for the bank 304*a-d*. A processor is also configured to update a tail entry 318, 322, 326, and 330 for a bank 304*a-d* when a new entry is added to the list for the bank 304*a-d* in response to a new data element being stored in the main memory 300.

As described above, a free entry manager is used to generate an available bank set for storing entries in the link memory. For an embodiment including multiple banks of memory, for example the embodiment illustrated in FIG. 3, the free entry manager is configured to generate an available bank set that includes one or more locations in each of the banks such that an access conflict will not occur. An access conflict would occur if a read or write access to a bank is required beyond the capabilities of a bank of the link memory. For example, a link memory including banks having a single access port would be limited to either one read or write per clock cycle. Thus, in an embodiment using banks with a single access port, a free entry manager would be configured to exclude locations of a bank scheduled for a read or write in a clock cycle from the available bank set.

According to an embodiment, a free entry manager is configured to generate an available bank set based on one or more of the following criteria including, but not limited to: 1) a location is not used by another data element; 2) a bank containing an entry to a list is not being accessed by a read operation; and 3) a bank containing a link entry is not accessed for linking operations. Linking operations include, but are not limited to write access to update metadata, read access to update a head or tail entry, write access to include metadata for a new entry to a list, access to invalidate an entry in a list, or other access to location in link memory. A free entry manager may also be configured to determine read/write access availability for banks including more than a single access port. A free entry manager is configured to determine the availability of a bank based on techniques known in the art including, but not limited to, a request bit/flag set, a request bus line activated, a scheduling protocol, or other indicator that access to a bank is scheduled or otherwise reserved.

Figure 4:
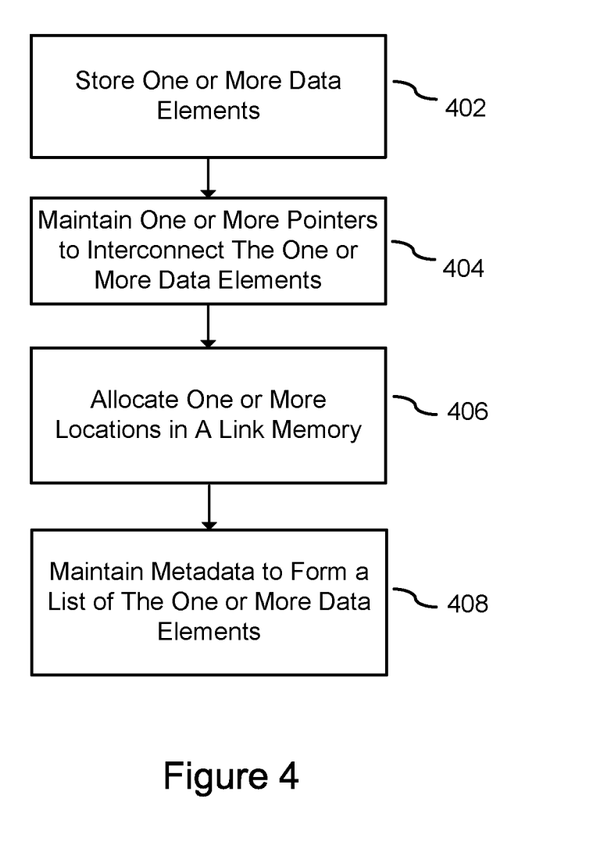
FIG. 4 illustrates a flow diagram for a method for implementing a distributed-linked list according to an embodiment.

FIG. 4 illustrates a flow diagram for a method for implementing a distributed-linked list according to an embodiment. The method includes storing one or more data elements 402. For example, storing one or more data elements in a main memory includes using techniques including those described herein. Further, the method includes maintaining one or more pointers to interconnect the one or more data elements 404. For example, maintaining one or more pointers to interconnect the one or more data elements includes storing and updating pointers and other metadata using techniques as described herein. The method also includes allocating one or more entries in a link memory 406. For example, allocating one or more entries in a link memory includes selecting a location from an available bank set of locations and setting a pointer to reference the address of that location using techniques including those described herein. Moreover, the method includes maintaining metadata to form a list of the one or more data elements 408. For example, maintaining metadata to form a list of the one or more data elements includes storing and updating head and tail entries using techniques including those described herein.

Figure 5:
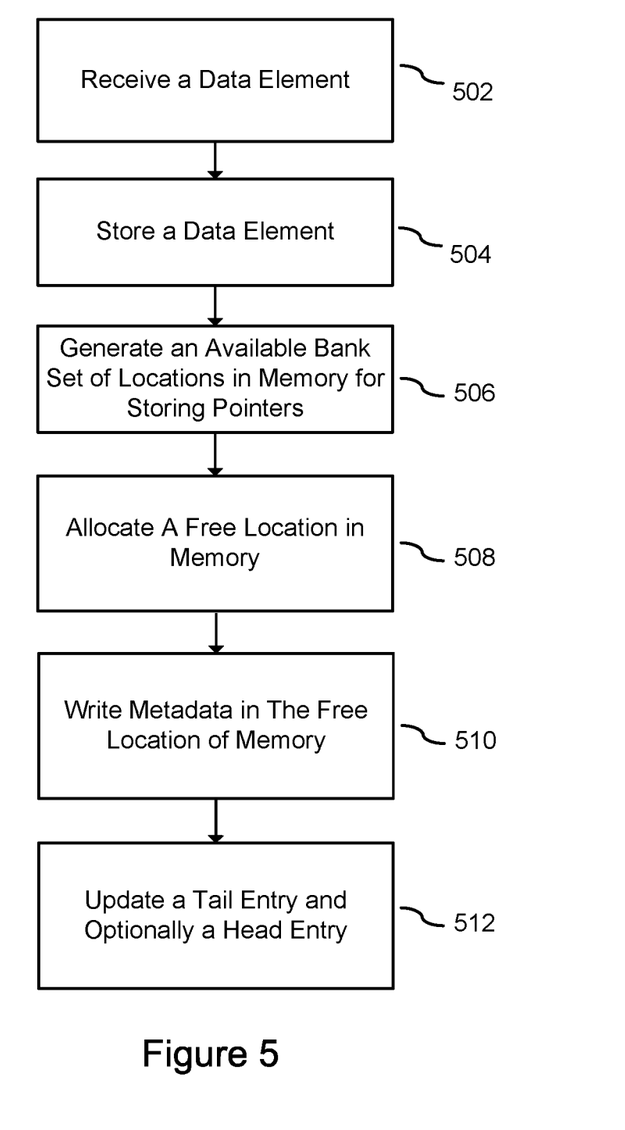
FIG. 5 illustrates a flow diagram for a method for storing a data element using a distributed-linked list according to an embodiment.

FIG. 5 illustrates a flow diagram for a method for storing a data element using a distributed-linked list according to an embodiment. The method includes receiving a data element 502. The method also includes storing a data element 504. Storing a data element includes using techniques including those described herein. Further, the method includes generating an available bank set of locations in memory for storing pointers 506. Generating an available bank set of locations for storing pointers includes using techniques including those described herein. The method also includes allocating a free location in memory 508. For example, allocating a free location in memory includes selecting a location from an available bank set of locations and setting a pointer to reference the address of that location. In addition, the method includes writing metadata in the free location in memory 510. Writing metadata in the free location in memory includes using techniques including those described herein. The method also includes updating a tail entry and optionally a head entry 512. For example, the method updates a head entry when a new list is created (enqueuing/linking) or the first entry in a list is read from memory (dequeuing/unlinking). The method updates a tail entry, for example, when a new entry is added to the list (enqueuing/linking), or the last entry is read from memory (dequeuing/unlinking). Updating a head entry and/or a tail entry includes using techniques including those described herein.

Figure 6:
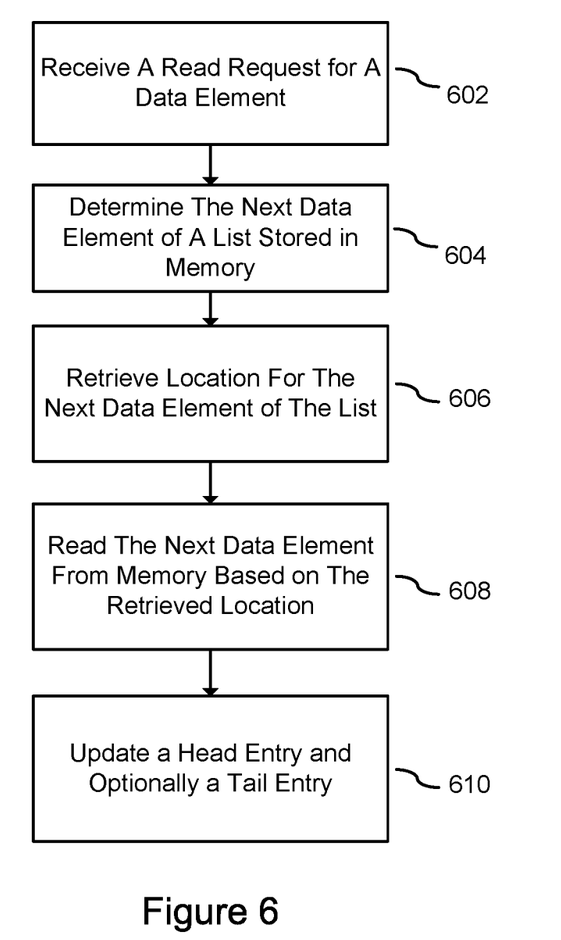
FIG. 6 illustrates a flow diagram for reading a data element using a distributed-linked list according to an embodiment.

FIG. 6 illustrates a flow diagram for reading a data element using a distributed-linked list according to an embodiment. The method includes receiving a read request for a data element 602. Further, the method includes determining the next data element of a list 604. For example, determining the next data element of a list includes using one or more head entries using techniques including those described herein. The method also includes retrieving the location for the next data element of the list 606. For example, retrieving the location for the next data element of the list includes reading the address of the location in memory of the next element from the head entry using techniques including those described herein. Moreover, the method includes reading the next data element from the memory based on the retrieved location 608. Reading the next data element from the memory based on the retrieved location includes using techniques such as those described herein. The method also includes updating a head entry and optionally updating a tail entry 610. For example, the method updates a head entry when a new list is created or the first entry in a list is read from memory. The method updates a tail entry, for example, when a new entry is added to the list, or the last entry is read from memory. Updating a head entry and/or a tail entry includes using techniques including those described herein.

Figure 7:
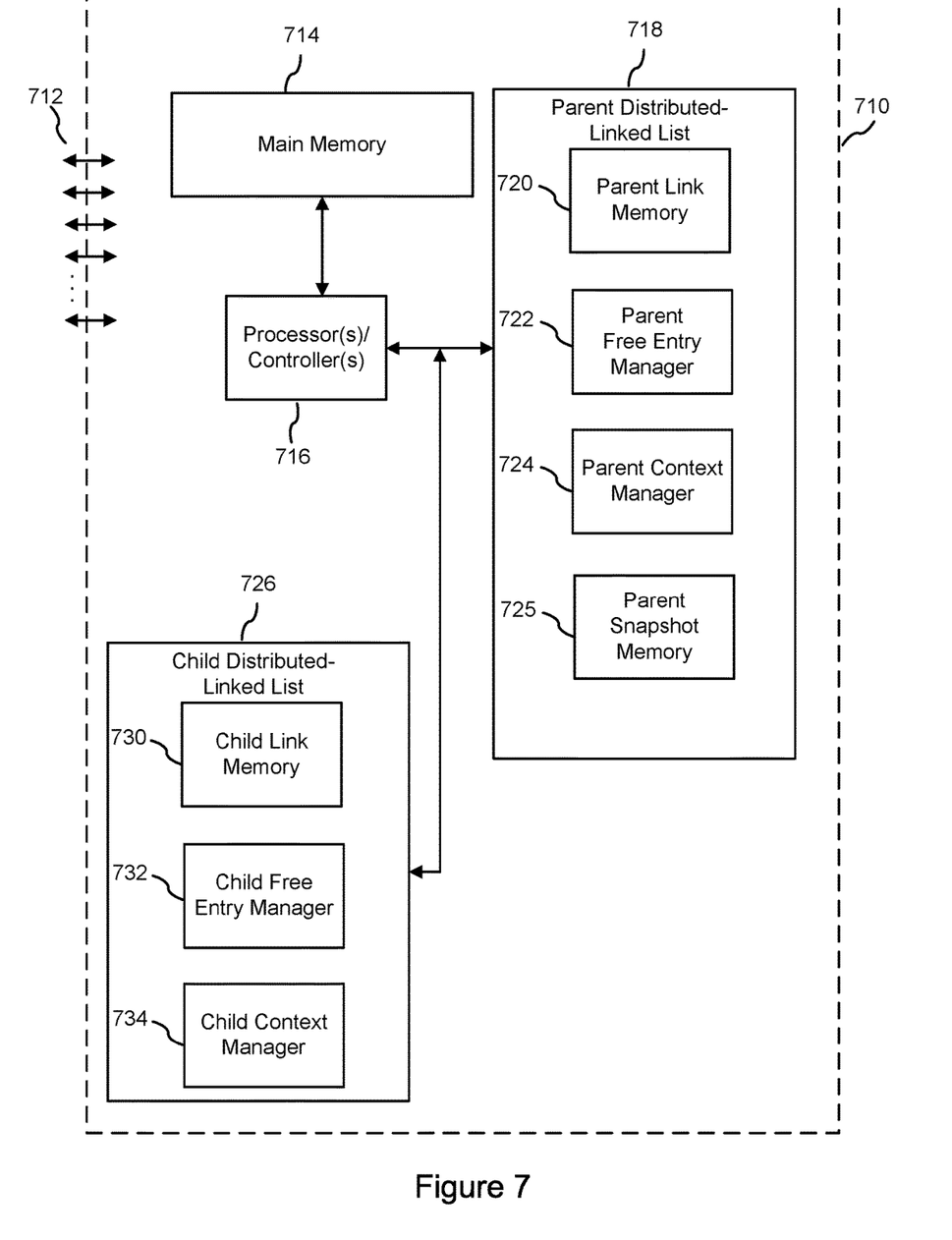
FIG. 7 illustrates a block diagram of a network device including a memory system implementing hierarchical distributed-linked list according to an embodiment.

FIG. 7 illustrates a block diagram of a network device including a memory system implementing a hierarchical distributed-linked list according to an embodiment. The memory system is configured to interconnect data elements by generating lists using techniques including those described herein. Further, the memory system implementing a hierarchical distributed-linked list is configured to generate one or more snapshots based on list metadata to maintain the lists of data elements. Maintaining list metadata includes generating, storing, and updating list metadata using techniques including those described herein. The memory system is configured to maintain linked-list metadata to interconnect a plurality of snapshots. For an embodiment, maintaining linked-list metadata includes generating, storing, and updating link-list metadata using techniques including those described herein.

For an embodiment, the memory system implementing a hierarchical distributed-linked list is configured to store multiple data packets split up into a plurality of cells, where each cell is then transmitted and received at a network device 710. The memory system is configured to receive cells of a data packet and to interconnect the cells of a data packet as the cells are received using a child distributed-linked list 726. The child distributed-linked list 726 is configured to generate a list of cells of a data packet using techniques describe herein with regard to implementing a distributed-linked list and generating lists of data elements. The list of cells generated by the child distributed-linked list 726 maintains the order of the cells of the data packet in the order the cells are received at a network device using a child link memory 730, a child free entry manager 732, and a child context manager 734. The child link memory 730 is configured to maintain metadata to interconnect data elements stored in the main memory 714 using techniques described herein with regard to implementing a link memory. The child free entry manager 732 is configured to generate a child available bank set of locations in the child link memory 730 using techniques including those described herein with regard to implementing a free entry manager. The child context manager 734 is configured to maintain list metadata including pointers that interconnect one or more data elements stored in the main memory 714 using techniques including those described herein with regard to implementing a free entry manager.

Further, a memory system implementing a hierarchical distributed-linked list, according to an embodiment, includes a parent distributed-linked list 718. The parent distributed-linked list 718 is configured to generate a snapshot based on a list of data elements generated by a child distributed-linked list 726. The parent distributed-linked list 718 is also configured to maintain linked-list metadata to interconnect multiple snapshots. By interconnecting snapshots, a parent distributed-linked list 718, for example, is configured to maintain the order of data packets in the order that the data packet is received at a network device, such as based on the order of the last cell received for a data packet. In addition, a parent distributed-linked list 718 is configured to form a queue of data packets by interconnecting snapshots. A queue may be formed based on destination address, network policies, traffic shaping, and/or other techniques including those known in the art for ordering data packets. Using a child distributed-linked list 726 to generate a list of cells for every data packet received and a parent distributed-liked list 718 to maintain linked-list metadata to generate snapshots to interconnect one or more lists of cells of a data packet, the memory system implementing a hierarchical distributed-linked list is configured to maintain the cells for each data packet received and to maintain the order of each data packet received such that each data packet can be retrieved from the memory system for egress based on the order received and/or the order the packet is placed in a queue.

Specifically, FIG. 7 illustrates a network device 710 including a plurality of input/output ports 712. Data packets are received and transmitted through the ports 712 using techniques including those known in the art. The ports 712 are coupled with a main memory 714. A main memory may include memory technologies including, but not limited to, dynamic random-access memory ("DRAM"), static random-access memory ("SRAM"), flash memory, and other technologies used to store data including those known in the art.

The main memory 714 is coupled with one or more processors 716. A processor 716 includes, but is not limited to, a central processing unit ("CPU"), a controller, an application-specific integrated circuit ("ASIC"), field-programmable gate arrays ("FPGA"), or other types of control units. The one or more processors 716 are configured to manage access to the main memory 714 using techniques including those known in the art. For example, the one or more processors 716 are configured to determine a location to store data received on one or more ports 712. The one or more processors 716 are also configured to read data stored in the main memory 714 when the data is to be transmitted on one or more ports 712. Further, the one or more processors 716 are configured to overwrite, update, and invalidate memory locations using techniques including those known in the art.

Further the embodiment illustrated in FIG. 7 includes a parent distributed-linked list 718. The parent distributed-linked list 718 is coupled with one or more processors 716. Further, the parent distributed-linked list 718 includes a parent link memory 720, a parent free entry manager 722, a parent context manager 724, and parent snapshot memory 725. The parent link memory 720 is configured to maintain linked-list metadata to interconnect a plurality of snapshots generated based on list metadata used to interconnect data elements stored in the main memory 714. For example, the parent link memory 720 is configured to store linked-list metadata including one or more pointers that reference at least one snapshot stored in a parent snapshot memory 725. The parent link memory 720 may include one or more of the memory technologies as described herein. The parent link memory 720 includes a plurality of locations for storing information. Each of the plurality of locations has an address used to access data stored in the location. For an embodiment, parent link memory 720 includes a plurality of memory banks with each of the memory banks including a plurality of locations and each location having an address used to access data. A parent link memory 720 may also include a single memory bank.

A parent distributed-linked list 718, according the embodiment illustrated in FIG. 7, also includes a parent free entry manager 722. The free entry manager 722 is configured to generate a parent available bank set of locations in the parent link memory 720. The parent available bank set is a group of one or more addresses in the parent link memory 720 that are not in use or allocated for use. For an embodiment, the one or more addresses reside in different memory banks of the parent link memory 720. For example, the parent free entry manager 722 is configured to maintain a list of addresses for the locations in parent link memory 720 that are not used for storing or allocated for storing linked-list metadata for interconnecting snapshots currently stored in a parent snapshot memory 725 as a parent available bank set. For an embodiment, a parent free entry manager 722 uses one or more memory technologies including those known in the art for storing a parent available bank set. For an embodiment, the one or more processors 716 are configured to remove a parent link memory address from the parent free entry manager 722 when a link memory address is used or allocated to store linked-list metadata to interconnect snapshots stored in a parent context manager 724. Further, the one or more processors 716 are configured to add a parent link memory address to the parent free entry manager 722 after the link memory address is no longer in use or allocated. For example, once a data element or data packet associated with a snapshot is read from main memory 714, the one or more processors 716 are configured to deallocate or invalidate a location of parent link memory 720 associated with the snapshot, which includes writing the address of the location in the parent free entry manager 722.

According to the embodiment illustrated in FIG. 7, the parent distributed-linked list 718 includes a parent context manager 724. The parent context manager 724 is configured to maintain snapshot list metadata including one or more pointers that interconnect one or more snapshots stored in the parent snapshot memory 725 to generate a list of snapshots. Maintaining snapshot list metadata includes generating, storing, and updating snapshot list metadata using techniques including those described herein. The parent snapshot memory 725 includes one or more of the memory technologies as described herein. The list metadata associated with a list of data elements maintained in the parent snapshot memory 725 is a snapshot. For an embodiment, the parent context manager 724 maintains snapshot list metadata including a head address—the address in the parent snapshot memory 725 for the first entry in a list of snapshots—and a tail address—the address in the parent snapshot memory 725 for the last entry in the list of snapshots. Embodiments of a memory system that implement a hierarchical distributed-linked list as described herein provide the benefit of delinking the main memory from the link memory. The delinking provides the use of more efficient memory technologies and architecture including, but not limited to, using single port memory and using memory with lower clock rates. This provides the use of lower cost memory technologies and lower power consumption while meeting the needs of a high-speed, high-capacity network device.

For an embodiment, the memory system is configured to store list metadata maintained in the child context manager 734 as a snapshot in the parent snapshot memory 725 in response to receiving the last data element of a list. The memory system may also be configured to store list metadata maintained in the child context manager 734 as a snapshot in the parent snapshot memory 725 in response to receiving a data element of a second list. For example, if the child context manager 734 is currently storing list metadata for a first list of data elements, such as the data elements associated with a first data packet, and a data element is received at the network device for a second list of data elements, such as data elements associated with a second data packet, the memory system is configured to store the list metadata for the first list as a first snapshot in the parent snapshot memory 725. The memory system is configured to retrieve the first snapshot from the parent snapshot memory 725 and store the list metadata from child context manager 734 to update the list metadata for the first list.

The memory system is also configured to retrieve a snapshot from the parent snapshot memory 725 and store the list metadata of the snapshot in the child context manager 734 in response to a request to transmit a data element or data packet. The memory system is configured to update the linked-list metadata in the parent context manager 724 and the parent link memory 720 and deallocate a location in the parent snapshot memory in response to a request to transmit a data element or data packet, for example, upon storing the list metadata of the snapshot in the child context manager 734. For an embodiment the processor(s)/controller(s) 716 are configured to retrieve a snapshot, store linked-list metadata, update linked-list metadata and other metadata using techniques including those known in the art.

Figure 8:
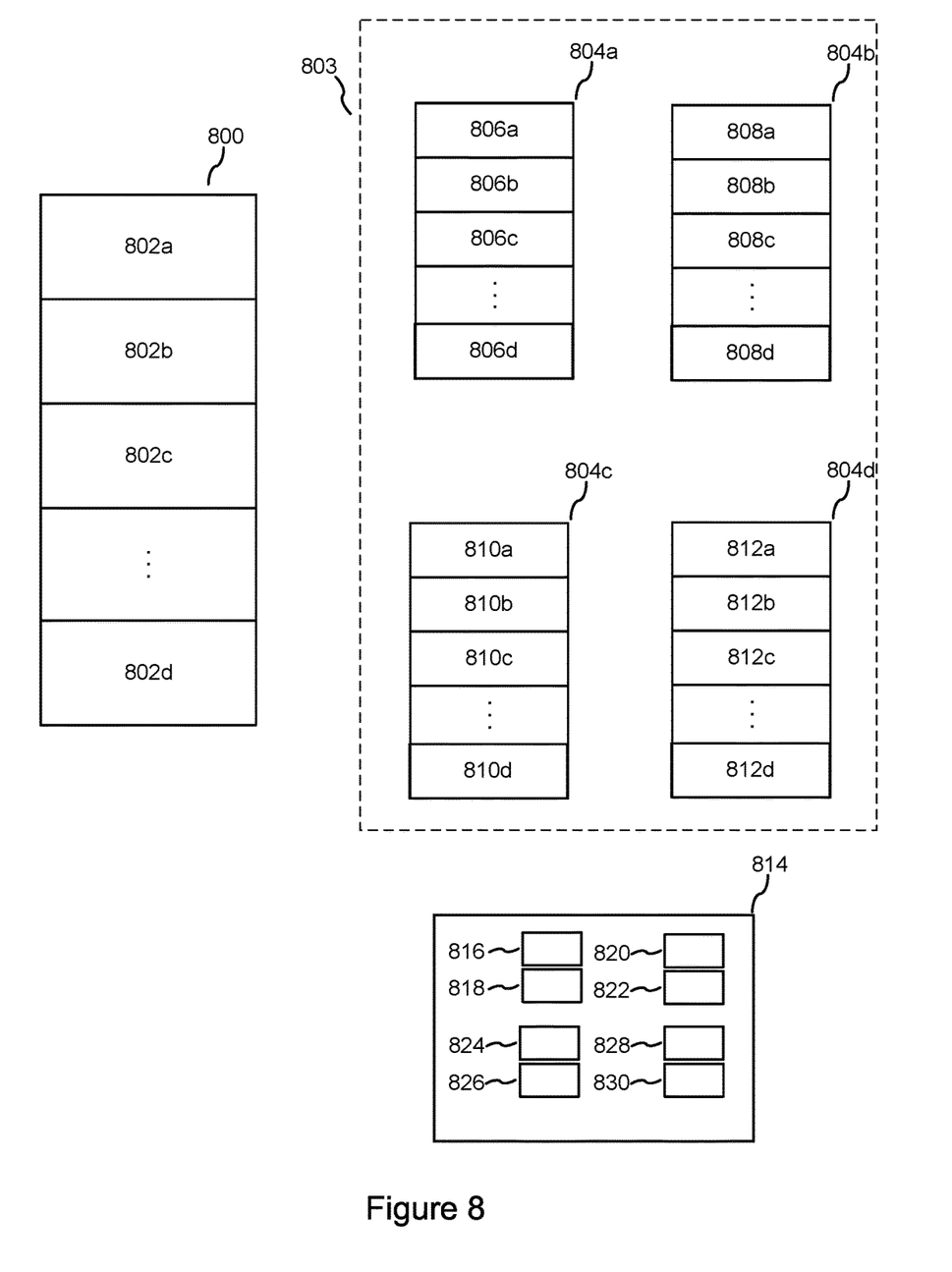
FIG. 8 illustrates a block diagram of a portion of a parent distributed-linked list including multiple banks of parent linked memory according to an embodiment.

FIG. 8 illustrates a block diagram of a portion of a parent distributed-linked list including multiple banks of parent linked memory according to an embodiment. The portion of the parent distributed-linked list includes a parent snapshot memory 800, a parent link memory 803, and a parent context manager 814. The parent snapshot memory 800 may be implemented using techniques described herein. The parent link memory 803 is formed from an array of memory elements, such as memory banks 804a-d. For an embodiment, each memory bank 804a-d is a single port memory that provides a single access per clock cycle. As illustrated in FIG. 8, the embodiment includes a first memory bank 804a including locations 806a-d, a second memory bank 804b including locations 808a-d, a third memory bank 804c including locations 810a-d, and a fourth memory bank 804d including locations 812a-d.

As illustrated in FIG. 8, the embodiment also includes a parent context manager 814. Parent context manager 814 includes multiple tail and head entries. Specifically, the parent context manager 814 includes a first head entry 816 and a first tail entry 818 for the first bank of parent link memory 804a, a second head entry 820 and a second tail entry 822 for the second bank of parent link memory 804b, a third head entry 824 and a third tail entry 826 for the third bank of parent link memory 804c, and a fourth head entry 828 and a fourth tail entry 830 for the fourth bank of parent link memory 804d. Each set of tail and head entries maintains snapshot list metadata for the first and last entry of a list of snapshots, respectively, for each bank of parent link memory 803. That is, the first head entry 816 maintains snapshot metadata for the first entry stored in the first bank 804a and the first tail entry 818 maintains snapshot metadata for the last entry stored in the first bank 804a. The second head entry 820 maintains snapshot metadata for the first entry stored in the second bank 804b and the second tail entry 822 maintains snapshot metadata for the last entry stored in the second bank 804b. The third head entry 824 maintains snapshot metadata for the first entry of a list of snapshots stored in the third bank 804c and the third tail entry 826 maintains metadata for the last entry of the list of snapshots stored in the third bank 804c. The fourth head entry 828 maintains snapshot metadata for the first entry of a list of snapshots stored in the fourth bank 804d and the fourth tail entry 830 maintains snapshot metadata for the last entry of the list of snapshots stored in the fourth bank 804d. Each head and tail entry is configured to store snapshot list metadata including metadata described herein. Together the lists of snapshots of each bank 804a-d are used to generate a complete snapshot list that interconnects one or more of the snapshots stored in the parent snapshot memory 800.

For an embodiment, a processor is configured to assign a snapshot sequence identifier to each snapshot. The snapshot sequence identifier indicates the order in which each snapshot was received at the network device. For example, a snapshot sequence identifier is assigned upon arrival of the last data-element received for the snapshot. The snapshot sequence identifier is stored as linked-list metadata in the location of the parent link memory 803 as described herein. In addition, the snapshot sequence identifier is stored in a head entry and optionally tail entry if the corresponding snapshot stored in the parent snapshot memory 800 is the head of a list of snapshots in a bank or a tail of a list of snapshots in a bank.

For an embodiment including multiple banks of parent link memory 803, such as the embodiment illustrated in FIG. 8, the memory system is configured to determine the next snapshot in a list of snapshots by comparing snapshot sequence identifiers assigned to snapshots. A memory system configured to determine the next snapshot includes a processor configured to read the head entries 816, 820, 824, and 828 stored for each bank 804a-d in the parent context manager 814. The processor compares the snapshot sequence identifiers stored in all of the head entries 816, 820, 824, and 828 to determine which of the snapshots is next in a list of snapshots. For an embodiment, the lowest snapshot sequence identifier is a numerical value assigned such that the lowest numerical value can be used to determine the next data element in a list; however, the system is not limited to using the lowest snapshot sequence identifier as an indicator. A snapshot sequence identifier, according to an embodiment, is assigned to a data element upon arrival to the network device. Once the processor determines the next snapshot in the list, the processor is configured to retrieve the address of the parent snapshot memory 802a-d where the snapshot is stored. For an embodiment, a processor is configured to retrieve the address from the head entry 816, 820, 824, and 828 having the lowest snapshot sequence identifier. A processor is further configured to use the retrieved address to read the data element out of the parent snapshot memory 800 and store the snapshot in a child context manager using techniques including those described herein.

For an embodiment, a processor is configured to update the linked-list metadata of a snapshot read out of the parent snapshot memory 800 that is stored in the head entry of the parent context manager 814. The processor is configured to use the address of the location in the parent link memory 803 that stores the next entry in the list of snapshots for the bank 804a-d. A processor is also configured to update a tail entry 818, 822, 826, and 830 for a bank 804a-d when a new snapshot is added to the list of snapshots for the bank 804a-d, for example, in response to a new snapshot being stored in the parent context memory 800.

As described above, a parent free entry manager is used to generate a parent available bank set for storing entries in the parent link memory 803. For an embodiment including multiple banks of memory, for example the embodiment illustrated in FIG. 8, the parent free entry manager is configured to generate a parent available bank set that includes one or more locations in each of the banks such that an access conflict will not occur. An access conflict would occur if a read or write access to a bank is required beyond the capabilities of a bank of the parent link memory. For example, a parent link memory including banks having a single access port would be limited to either one read or write per clock cycle. Thus, in an embodiment using banks with a single access port, a parent free entry manager would be configured to exclude locations of a bank scheduled for a read or write in a clock cycle from the parent available bank set.

According to an embodiment, a parent free entry manager is configured to generate a parent available bank set based on one or more of the following criteria including, but not limited to: 1) a location is not used by another data element; 2) a bank containing an entry to a list is not being accessed by a read operation; and 3) a bank containing a link entry is not accessed for linking operations. Linking operations include, but are not limited to write access to update linked-list metadata, read access to update a head or tail entry, write access to include linked-list metadata for a new entry to a list, access to invalidate an entry in a list of snapshots, or other access to location in parent link memory. A parent free entry manager may also be configured to determine read/write access availability for banks including more than a single access port. A parent free entry manager is configured to determine the availability of a bank based on techniques known in the art including, but not limited to, a request bit/flag set, a request bus line activated, a scheduling protocol, or other indicator that access to a bank is scheduled or otherwise reserved.

Figure 9:
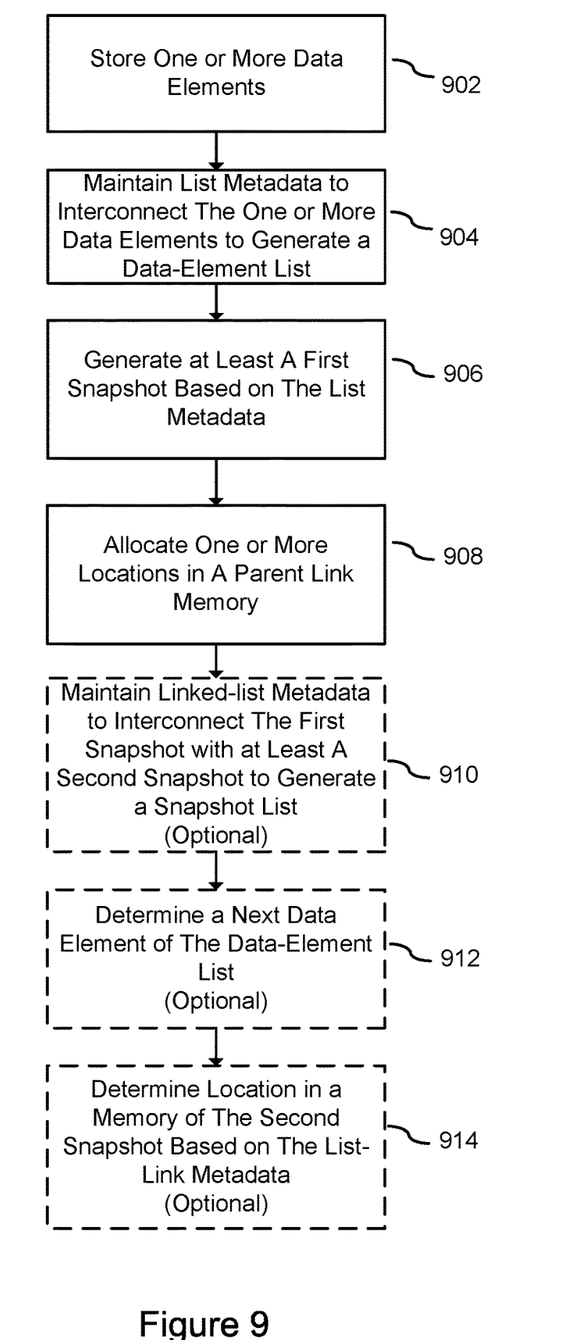
FIG. 9 illustrates a flow diagram for a method for implementing a hierarchical distributed-linked list according to an embodiment.

FIG. 9 illustrates a flow diagram for a method for implementing a hierarchical distributed-linked list according to an embodiment. The method includes storing one or more data elements (902) using techniques including those described herein. The method also includes maintaining list metadata to interconnect the one or more data elements (904) using techniques including those described herein. Further, the method includes generating at least a first snapshot based on the list metadata (906) using techniques including those described herein. The method includes allocating one or more locations in a memory (908) using techniques including those described herein. In addition, the method optionally includes maintaining linked-list metadata to interconnect the first snapshot with at least a second snapshot (910) using techniques including those described herein. Moreover, the method optionally includes determining a next data element of said data-element list based on said list metadata (912) using techniques including those described herein. The method optionally includes determining a location in a memory of the second snapshot based on said linked-list metadata 914.

Embodiments described herein may be implemented using one or more of a semiconductor chip, ASIC, FPGA, and using discrete components. Moreover, elements of the memory system may be implemented as one or more cores on a semiconductor chip, such as a system on a chip ("SoC"). Embodiments described herein may also be implemented on a machine, such as a network device and one or more computer systems, including a program storage device. The program storage device includes, but is not limited to, one or more of any of mass storage that is remotely located from the machine, random access memory, non-volatile memory, magnetic or optical storage disks, and other computer readable storage mediums.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. An apparatus, comprising:
a main memory configured to store data elements;
write circuitry configured to:
  write a first data packet as first data elements to the main memory;
  write a first child distributed linked list that includes first data-element pointers to the main memory to interconnect the first data elements stored in the main memory;
  write a parent distributed linked list to include a first snapshot that represents (i) a first child pointer to the first child distributed linked list and (ii) a first sequence identifier associated with the first snapshot;
  after writing the first data packet to the main memory, write a second data packet as second data elements to the main memory;
  write a second child distributed linked list that includes second data-element pointers to the main memory to interconnect the second data elements stored in the main memory; and
  update the parent distributed linked list to include a second snapshot that represents (i) a second child pointer to the second child distributed linked list and (ii) a second sequence identifier associated with the second snapshot; and
read circuitry configured to read the first data packet and the second data packet in sequence using respectively the first snapshot and the second snapshot included in the parent distributed linked list, wherein an order of the read is based on sequence identifiers.

2. The apparatus of claim 1, further comprising:
a child context manager that is configured to store metadata corresponding to the first data-element pointers and the second data-element pointers.

3. The apparatus of claim 2, wherein the child context manager includes a plurality of nodes, and
wherein the metadata includes sequence identifiers for determining an order for accessing the plurality of nodes in the child context manager.

4. The apparatus of claim 1, further comprising:
a child link memory including a plurality of memory banks, wherein each memory bank stores one or more entries, each entry including: (i) a main memory location address that stores a data element identified by the entry, and (ii) a child link memory location address storing a next data element in a group of data elements corresponding to the data element identified by the entry.

5. The apparatus of claim 4, further comprising:
a child context manager that is configured to store metadata corresponding to the first data-element pointers and the second data-element pointers, wherein metadata for a data-element pointer includes a pointer for accessing a child link memory entry corresponding to the data element.

6. The apparatus of claim 4, further comprising:
a child free-entry manager that is configured to generate a set of available memory banks in the child link memory, wherein the set of available memory banks includes one or more locations such that an access conflict between two read or write operations does not occur.

7. The apparatus of claim 1, further comprising:
a parent snapshot memory that is configured to store metadata representing snapshots of the parent distributed linked list.

8. The apparatus of claim 7, further comprising:
a parent link memory that includes a plurality of memory banks configured to store snapshot memory pointers that point to the snapshots stored in the parent snapshot memory.

9. The apparatus of claim 8, further comprising:
a parent free-entry manager that is configured to generate a set of available memory banks in the parent link memory, wherein the set of available memory banks includes one or more locations such that an access conflict between two read or write operations does not occur.

10. The apparatus of claim 8, further comprising:
a parent context manager that includes a plurality of head entries corresponding to the plurality of memory banks,
wherein each head entry of the plurality of head entries is configured to store (i) a respective snapshot memory pointer pointing to a respective node in a respective memory bank of the parent link memory and (ii) a respective sequence identifier for the respective node, and
wherein the read circuitry is configured to use the head entries in the parent context manager to determine, based on the respective sequence identifier stored in each head entry of the plurality of head entries, the order for accessing the plurality of memory banks.

11. A method, comprising:
writing, to a main memory in a network device, a first data packet as first data elements;
writing, to a child context manager, a first child distributed linked list that includes first data-element pointers to the main memory to interconnect the first data elements stored in the main memory;
writing, to a parent snapshot memory, a parent distributed linked list to include a first snapshot that represents (i) a first child pointer to the first child distributed linked list and (ii) a first sequence identifier associated with the first snapshot;
after writing the first data packet to the main memory, writing a second data packet as second data elements to the main memory;
writing, to the child context manager, a second child distributed linked list that includes second data-element pointers to the main memory to interconnect the second data elements stored in the main memory; and
updating the parent distributed linked list in the parent snapshot memory to include a second snapshot that represents (i) a second child pointer to the second child distributed linked list and (ii) a second sequence identifier associated with the second snapshot; and
reading the first data packet and the second data packet in sequence using respectively the first snapshot and the second snapshot included in the parent distributed linked list, wherein an order of the read is based on sequence identifiers.

12. The method of claim 11, wherein writing the first child distributed linked list or the second child distributed linked list to the child context manager comprises:
storing, in the child context manager, metadata corresponding to the first data-element pointers and the second data-element pointers, wherein metadata for a data-element pointer includes a pointer for accessing, in a child link memory, an entry corresponding to the data element.

13. The method of claim 12, wherein the child context manager includes a plurality of nodes, and
wherein the metadata includes sequence identifiers for determining an order for accessing the plurality of nodes in the child context manager.

14. The method of claim 13, wherein the child link memory includes a plurality of memory banks, the method further comprising:
storing, in each memory bank, one or more entries, each entry including: (i) a main memory location address that stores a data element identified by the entry, and (ii) a child link memory location address storing a next data element in a group of data elements corresponding to the data element identified by the entry.

15. The method of claim 14, further comprising:
generating, using a child free-entry manager, a set of available memory banks in the child link memory, wherein the set of available memory banks includes one or more locations such that an access conflict between two read or write operations does not occur.

16. The method of claim 11, further comprising:
storing, in a parent link memory that includes a plurality of memory banks, snapshot memory pointers that point to the snapshots stored in the parent snapshot memory.

17. The method of claim 16, further comprising:
generating, using a parent free-entry manager, a set of available memory banks in the parent link memory, wherein the set of available memory banks includes one or more locations such that an access conflict between two read or write operations does not occur.

18. The method of claim 16, further comprising:
storing, in each head entry of a plurality of head entries in a parent context manager: (i) a respective snapshot memory pointer pointing to a respective node in a respective memory bank of the parent link memory and (ii) a respective sequence identifier for the respective node,
wherein the plurality of head entries corresponds to the plurality of memory banks; and
determining, using the head entries in the parent context manager, the order for accessing the plurality of memory banks, wherein the order is based on the respective sequence identifier stored in each head entry of the plurality of head entries.

19. A network device, comprising:
a main memory configured to store data elements;
write circuitry configured to:
write a first data packet as first data elements to the main memory;

write a first child distributed linked list that includes first data-element pointers to the main memory to interconnect the first data elements stored in the main memory;

write a parent distributed linked list to include a first snapshot that represents (i) a first child pointer to the first child distributed linked list and (ii) a first sequence identifier associated with the first snapshot;

after writing the first data packet to the main memory, write a second data packet as second data elements to the main memory;

write a second child distributed linked list that includes second data-element pointers to the main memory to interconnect the second data elements stored in the main memory; and update the parent distributed linked list to include a second snapshot that represents (i) a second child pointer to the second child distributed linked list and (ii) a second sequence identifier associated with the second snapshot; and read circuitry configured to read the first data packet and the second data packet in sequence using respectively the first snapshot and the second snapshot included in the parent distributed linked list, wherein an order of the read is based on sequence identifiers.

20. The network device of claim 19, further comprising:

a child link memory including a plurality of memory banks, wherein each memory bank stores one or more entries, each entry including: (i) a main memory location address that stores a data element identified by the entry, and (ii) a child link memory location address storing a next data element in a group of data elements corresponding to the data element identified by the entry;

a child context manager that is configured to store metadata corresponding to the first data-element pointers and the second data-element pointers, wherein metadata for a data-element pointer includes a pointer for accessing a child link memory entry corresponding to the data element;

a parent snapshot memory that is configured to store metadata representing snapshots of the parent distributed linked list;

a parent link memory that includes a plurality of memory banks configured to store snapshot memory pointers that point to the snapshots stored in the parent snapshot memory; and a parent context manager that includes a plurality of head entries corresponding to the plurality of memory banks, wherein each head entry of the plurality of head entries is configured to store (i) a respective snapshot memory pointer pointing to a respective node in a respective memory bank of the parent link memory and (ii) a respective sequence identifier for the respective node, and wherein the read circuitry is configured to use the head entries in the parent context manager to determine, based on the respective sequence identifier stored in each head entry of the plurality of head entries, the order for accessing the plurality of memory banks.

* * * * *